United States Patent
Lendlein et al.

(10) Patent No.: US 6,852,825 B2
(45) Date of Patent: Feb. 8, 2005

(54) POLYESTER URETHANES

(75) Inventors: Andreas Lendlein, Berlin (DE);
Annette Schmidt, Neuss (DE); Karl Kratz, Moenchengladbach (DE);
Jürgen Schulte, Aachen (DE)

(73) Assignee: Mnemoscience GmbH, Aachen (DE)

( * ) Notice: Subject to any disclaimer, the term of this patent is extended or adjusted under 35 U.S.C. 154(b) by 0 days.

(21) Appl. No.: 10/418,615

(22) Filed: Apr. 17, 2003

(65) Prior Publication Data

US 2004/0014929 A1 Jan. 22, 2004

(30) Foreign Application Priority Data

Apr. 18, 2002 (DE) .......................................... 102 17 350

(51) Int. Cl.[7] .......................... C08G 18/42; C08L 75/06; C08J 9/04; C08J 9/28; A61K 47/34
(52) U.S. Cl. ...................... 528/80; 514/772.7; 514/785; 521/79; 521/172; 525/123; 525/440; 525/454; 528/76
(58) Field of Search .............................. 514/772.7, 785; 521/79, 172; 525/123, 440, 454; 528/76, 80

(56) References Cited

U.S. PATENT DOCUMENTS

| | | | | |
|---|---|---|---|---|
| 3,894,075 A | * | 7/1975 | Schoen ........................ | 560/185 |
| 4,035,548 A | * | 7/1977 | Chang et al. ................ | 428/412 |
| 4,085,092 A | * | 4/1978 | Chang et al. ................. | 528/80 |
| 6,160,084 A | | 12/2000 | Langer et al. .............. | 528/272 |

FOREIGN PATENT DOCUMENTS

| | | |
|---|---|---|
| WO | WO 99/42147 | 8/1999 |
| WO | WO 99/42528 | 8/1999 |
| WO | WO 01/91822 A1 | 12/2001 |

OTHER PUBLICATIONS

Byung K. K. et al., "Polyurethanes having shape memory effects," Polymer, Elsevier Science Publishers B.V. GB, Bd. 37, Nr. 26, 1996, Seiten, pp. 5781–5793, XP004070893.

* cited by examiner

Primary Examiner—Rabon Sergent
(74) Attorney, Agent, or Firm—Kalow & Springut LLP

(57) ABSTRACT

The present invention relates to polyester urethanes comprising polypentadecalactone segments. These polyester urethanes do show good properties which may be adjusted in a controlled manner. In preferred embodiments the polyester urethanes display additionally polycaprolactone segments. Such polymer may show shape memory effects.

14 Claims, No Drawings

POLYESTER URETHANES

The present invention relates to polyester urethanes comprising a specific component of polypentadecalactone (PDL).

Plastic materials are valuable synthetic polymeric materials which have secured a prominent place in many applications in the art. By varying the different components of polymers attempts are made to achieve optimum properties for the desired applications, in order to respond precisely and selectively to specific demands. A class of in particular interesting products are polyurethanes since these materials may be produced by addition reactions of preformed segments, without producing undesired side products. A known class of polyurethanes are polyurethanes comprising two different polyester components, namely a polycaprolactone segment and a polyparadioxanone segment. These materials, described in WO-A-99-42528 and WO-A-99-42147, do show shape memory effects, wherein the polycaprolactone segment serves as trigger segment and the polyparadioxanone segment serves as so called hard segment. The use of polyparadioxanone segments however is problematic in some applications since this segment provides the polyester urethanes with a rather rapid biodegradability. Furthermore a lot of the known polyester urethanes do not show the desired mechanical properties, so that the use of novel segments is necessary, in order to meet the ever increasing demands concerning the applications of polymeric materials. Finally polymeric materials should preferable enable the controlled adjustment of desired properties over a broad range, preferably by means of modifications with minor chemical amendments only.

It is the object of the present invention to provide a novel polymeric material which is able to overcome the drawbacks cited above in connection with the known materials.

This object is achieved with a polyester urethane comprising as essential component a segment of polypentadecalactone.

Preferred embodiments are described in the subclaims.

The most basic form of the present invention may be seen in the use of polypentadecalactone segments in polyester urethanes. The polypentadecalactone segments may be the only polyester segments in the polyester urethan or further segments, different from polypentadecalactone may be present. In a preferred embodiment the polypentadecalactone segments are employed as hard segments in the polyester urethane, which, in addition to the polypentadecalactone segments, do comprise further polyester segments, preferably polycaprolactone segments, as soft segments. These further segments may be selected among a broad variety of chemically different components which are suitable as soft segment. Specific examples which may be named comprise partially crystalline segments, comprising polyester segments, polyether ester segments and polyether segments, such as polycaprolactone segments (PCL), polycaprolactone-co-polytetrahydrofurane segments (PCL-co-pTHF), tetrahydrofurane segments (pTHF), polypropyleneglycol segments (PPG) and polyethyleneglycol segments (PEG), as well as glassy segments, comprising polyester and copolyester, such as poly-L-lactid-co-glycolide (ran) (PLGA) and poly-DL-lactide (P-DL-LA). In particular a combination of polypentadecalactone segments and polyethyleneglycole segments enables intriguing properties of the resulting material due to the combination of hydrophobic and hydrophilic segments.

The polypentadecalactone segment, contained in the polyester urethane used in accordance with the present invention, is usually introduced into the polyester urethane in the form of a macro diol. This segment may be obtained by ring opening polymerisation from $\omega$-pentadecalactone employing tin catalysis and using ethylene diol as initiator. The ratio of initiator to monomer controls the molecular weight of the segment. The molecular weight of the polypentadecalactone segments in the polyester urethane used in accordance with the present invention is not critical. Usually the number average of the molecular weight is however in the range of from 1000 to 20,000 g/mol, preferably to 2000 to 11,000 g/mol, determined by GPC-analysis. The macrodiol from pentadecalactone may be converted to a polyester urethane using those diisocyanates which are typically employed for the preparation of polyurethanes. Preferred diisocyanate are compounds having the formula O=C=N—R—N=C=O wherein R is aromatic or aliphatic. Preferably however R is aliphatic comprising a carbon chain of from 1 to 10, preferably 2 to 8 and in particular preferably 4 to 7 carbon atoms. This carbon chain may be saturated with hydrogen or may show additional substituents. These substituents comprise short chain alkyl groups, in particular methyl groups. A preferred diisocyanate is trimethyl hexane-1,6-diisocyanate.

By varying the molecular weight of the polypentadecalactone segment the properties of the polyester urethane may be varied. The molecular weight of the polyester urethane is not critical and may be selected in accordance with the desired use. Typical molecular weights (number average, determined by GPC) are in the range of from 50,000 to 250,000 g/mol, preferably within the range of 60,000 to 200,000 g/mol and in particular within the range of 62,000 to 196,000 g/mol.

The polyester urethanes in accordance with the present invention which comprise polypentadecalactone segments do show a melting temperature, depending from the molecular weight within the range of about 90° C. (preferably 87–95° C.). Typical mechanical properties are sche E-Modulus of about 17 MPa, an elongation at break at 70° C. of about 1000% and a tensile strength of about 18 MPa. Polyester urethanes comprising polycaprolactone segments, which are known from the prior art do show values for E-Modulus and tensile strength of only 0.5 and 2 MPa, respectively. The material in accordance with the present invention, although differing with respect to their chemical composition only to a minor extend from the polycaprolactone urethanes, are therefore valuable materials having a great potential for a variety of applications. The slower biodegradability of polypentadecalotone segments, compared with polycaprolactone segments enables the application in fields where an increased stability within a physiological environment is desired, for example implants for long time application. The use of segments made from pentadecalactone further offers the advantage that this monomer is readily available at moderate costs due to its use within the cosmetic industry.

Preferably the polyester urethane comprises in addition to the polypentadecalactone segment at least one further polyester segment, such as those named above. In particular this further segment is a polycaprolactone segment. These polyester urethanes are block copolymers comprising polypentadecalactone segments, linked with other polyester segments, preferably polycaprolactone segments. The further segments, in particular the polycaprolactone segments, may, as described above for the polypentadecalactone segment, be introduced into the polyester urethane in the form of a macrodiol. This macrodiol may be prepared using the usual processes known to the skilled person, such as ring opening polymerisation of ε-caprolactone, in accordance with the process described above.

The molecular weight of the additional segments, as described above for the polycaprolactone segments, is not critical. However, typically these segments do show a number average of the molecular weight, determined by GPC, of from 1000 to 20,000 g/mol preferably 2,000 to 11,000 g/mol, wherein the preferred range for the PEG segments is from 2000 to 20,000 g/mol, for the PLGA segments from 4000 to 9000 g/mol and for P-DL-LA from 5000 to 11,000 g/mol. The polyester urethanes comprising additional segments, preferably polycaprolactone segments do show preferably a molecular weight of from 50,000 to 250,000 g/mol (number average, determined by GPC), more preferably of from 60,000 to 200,000 g/mol and in particular preferably from 62000 to 196,000 g/mol (and in some embodiments of from 55,000 to 100,000 g/mol). The content of polypentadecalactone units may be varied over a broad range, preferably the content of pentadecalactone units is in the range of from 10 to 80 wt %, in particularly within the range of from 20 to 60 wt %.

When the above described polyester segments are converted by a polyaddition rection using the above disclosed diisocyanates to polyester urethanes in accordance with the present invention, a variation of the respective amounts and molecular weights of the polyester segments enables an adjustment of the profile of properties of the resulting polyester urethanes. This preferred embodiment of the present invention provides a polymeric system which enables, by modifying simple starting materials, a control of the resulting properties.

The materials in accordance with the present invention may be used in the form of fibres, such as in wrinkle resistant textiles, in the form of different shaped articles, for example in the field of medicine, as slowly degrading implants or in the form of coatings, for example on short term implants, such as cannulae or lead-wires. The use as coating material may increase the bio compatability of the coated articles and may therefore protect the user from undesired side reactions during use of the coated articles.

The preferred polyester urethanes of the present invention, which comprise in addition to the polypentadecalactone segments further segments, preferably polycaprolatone segments, do display further preferred profiles of properties.

The introduction of further segments, preferably polycaprolactone segments, into the polyester urethanes of the present invention introduces a second melting temperature, which may be detected during DSC measurements, into the polyester urethane. This second melting temperature usually lies in the range of above 50° C., depending from the molecular weight and the proportion of the further segment, preferably the polycaprolactone segment, in the polyester urethane.

In addition the mechanical properties may be controlled over a broad range. With increasing content of polypentadeclactone the value for E-Modulus may be increased as well. The value for the elongation at break may be adjusted to 600 to 1200% with increasing content of polypentadecalactone and in addition tensile strength may be adjusted in a range of from 4 to 10 MPa with increasing content of the polypentadecalactone segment (all values determined at 70° C.). The reduced, i.e. slower biodegradability of the polypentadecalactone segments, compared to polyparadioxanone segments used so far in the prior art, the preferred polyester urethanes of the present invention may also be employed in applications for which the known polyester urethanes were not suitable due to their faster degradability and the therewith associated decreased mechanical stability. Compared with known polyester urethanes comprising polycaprolactone segments and polyparadioxanone segments, the polyester urethanes of the present invention furthermore do display an improved production stability and ability to be granulated, which simplifies the production and the processing of the polyester urethanes of the present invention. The known polyester urethanes having poly-p-dioxanone segments in particular undergo degradation reactions upon extrusion, while the polyester urethanes of the present invention do show an improved stability in this respect. The materials of the present invention do show a good biocompatability, which was proven with appropriate evaluations The more preferred polyester urethanes of the present invention which do comprise polypentadecalactone segments as well as further segments, preferably polycaprolactone segments furthermore do display shape memory properties, so that accordingly these preferred materials may be designated shape memory polymers (SMP).

Such materials are obtained in particular if, within the polyester urethane of the present invention, the polypentadecalactone segments and the further segments, preferably polycaprolactone segments, are present in specified amounts. These specified amounts may be adjusted by appropriate selection of the molecular weight and content (wt.-%) of the further segments, preferably caprolactone segments, and the pentadecalactone segments. Generally speaking, with similar or equal number average molecular weights, SMP materials may be preferably obtained if the content of further segments, preferably caprolactone segments, within the polyester urethane is higher than the content of pentadecalactone units. Is the molecular weight of the further segments, preferably polycaprolactone segments, within the polyester urethane however higher than the molecular weight of the polypentadecalactone units, the content of pentadecalactone units may be higher than the content of further segments, preferably caprolactone units.

Good SMP-materials may in particular be obtained using the following compositions:

Polypentadecalactone segment: Molecular weight 1000 to 10,000 g/mol (number average), preferably 1500 to 5000, in particular 2000 to 3000 g/mol.

Polycaprolactone segment: Molecular weight 3000 to 11,000 g/mol (number average), preferably 4000 to 10,000 g/mol.

Polycaprolactone-co-polytetranadrofurane segment: molecular weight 1000 to 5000 g/mol (number average), preferably 1500 to 3500 g/mol.

Polytetrahydrofurane segment: Molecular weight 1000 to 5000 g/mol (number average), preferably 1500 to 3000 g/mol.

Polypropyleneglacol segment: molecular weight 1000 to 8000 g/mol (number average), preferably 1200 to 4500 g/mol.

Polyethyleneglycol segments: Molecular weight 1000 to 25,000 g/mol (number average), preferably 1500 to 20,0000 g/mol.

Poly-L-lactide-co-glycolide segment (ran): Molecular weight 4000 to 10,000 g/mol (number average), preferably 5000 to 8000 g/mol.

Poly-DL-lactide segment: Molecular weight 4000 to 15,000 g/mol (number average), preferably 5000 to 11,000 g/mol.

Polyesterurethane: Molecular weight 50,000 to 200,000 g/mol (number average), preferably 60,000 to 190,000 g/mol; content of the additional segment 20 to 80 wt %, preferably 45 o 70 wt %, more preferably 50 to 60 wt %, content polypentadecalactone segment 80 to 20 wt %, preferably 55 to 30 wt %, more preferably 40 to 50 wt %.

The polymers of the present invention may be blended with further components, which further widens their range of application. Fillers, such as silica, barium sulfate and similar materials, medicinal active compounds, such as anti bactericides, funguzides and similar materials of organic or inorganic nature, such as nano-silver, and colorants may be blended with the polymers of the present invention. The valuable properties of the polymers are usually not affected if the addition amount is within the range up to 25% (based on the weight of the total blend), preferably within the range of from 1 to 10%.

It is furthermore possible to blend the polymers of the present invention with other commercially available polymers, such as polyolefins, in particular polyethylene and polypropylene, or vinyl polymers, such as polystyrene and PVC. It could be shown that with an content of from 50 to 90 wt.-% of the polymer in accordance with the present invention, the shape memory properties could be retained. This enables in particular the preparation of low cost SMP materials since the commercially available blend components are, compared with the polymers of the present invention relatively cheap and may be blended in an amount of up to 50 wt.-%.

The blending of the above named additional components may be accomplished in a usual manner known to the skilled person, for example by compounding using suitable kneaders or extruders.

The polyester urethanes of the present invention which comprise only pentadecalactone units in the polyester segments furthermore show the surprising property that these polyester urethanes, blended with other polyesters, preferably PCL and a polyester urethane based on PCL yield a blend showing shape memory properties, although the single blend components do not show such properties. The blend ratio preferably is selected in such a way, so that the polyester urethane of the pentadecalactone segments is present in the blend in an amount of from 20 to 80 wt.-%, preferably 40 to 60 wt.-%. Without being bound to this theory it is assumed that a compatabilisation is achieved through the urethane segments which yields a mixture, which corresponds, as far as macroscopic properties are concerned, to the covalently crosslinked shape memory materials.

Such blends may be prepared by coprecipitation from a solution or by compounding. Coprecipitation results in a superior mixing. However coprecipitation has drawbacks due to the use of solvents, in particular regarding costs as well as regarding working safety.

The materials in accordance with the present invention furthermore may be processed in order to obtain interesting products, such as foams (porous structures) as well as micro carriers (micro beads), which may be employed over a broad range of applications. Due to the properties of the materials valuable products in particular in the medicinal field may be obtained.

Production of a foam may be carried out in the usual way, such as compounding with a foaming agent and extruding or by thermally induced phase separation of a polymer solution. The type of foaming agent is not critical and it has been proven that usual foaming agents may be employed using master batch technology.

The foams which may be obtained generate, due to their shape memory properties which are not lost due to foam preparation, controlled forces upon recovery of the permanent shape, which opens up further application fields.

During the production of the foam the pore size as well as the pore size distribution may be controlled in the manner known to the skilled person, by adjusting the geometric configuration of the screw, processing temperature and torque.

The micro carriers of the present invention, which may for example be employed for Tissue Engineering, may be produced from the materials of the present invention using usual processes, such as solvent evaporation of an emulsion or by thermally induced phase separation of a solution, in each case comprising at least one polyester urethane of the present invention. The size of the micro carriers (av. Diameter) may vary within the range of from 100 nm to 800 $\mu$m, preferably 100 to 200 $\mu$m, depending from the desired field of application. The particles substantially show a spherical shape and often do show an inner hollow cavity. The surface is predominantly smooth with some structures within the nanometer region.

The present invention is further illustrated with the following examples.

Preparation of Polyester Macrodiols

Caprolactone and pentadecalactone, respectively were polymerised under ring opening using ethylene glycol as initiator and dibutyl tin as catalyst, without addition of any solvent, at 130° C. The typical reaction time was 5 hours. Selecting the amount of initiator adjusts the molecular weight.

In this manner different macrodiols were prepared having molecular weights (number average) of 10000, 2000 and 3000 g/mol for macrodiols form pentadecalactone and 10000 and 4000 g/mol for macrodiols from caprolactone.

Further polyester urethanes, in which the segments of PCL had molecular weights of 2000, 3000, 4000 and 10000 g/mol and in which the segments of PDL has molecular weights of 2000 and 3000 g/mol were evaluated and it was found that the materials showed a melting point of the PCL segments in the range of from 30 to 55° C., which is preferred in particular for many applications in the medicinal field.

Preparation of Polyester Urethanes

These macrodiols were reacted using a mixture of 2,2,4- and 2,4,4-trimethylhexane-1,6-diisocyanate to obtain polyester urethanes. This reaction was carried out at 80° C. using dioctyl tin as catalyst and 1,2-dichloroethyne as solvent. The average reaction time was two days.

In this manner different polyester urethanes were prepared which are summarized in the following table. PDL describes the amount of pentydecalactone within the polyester urethane (neglecting the diisocyanate linkers) as well as the molecular weight of the polypentadecalactone segments. PCL provides the corresponding values for the caprolactone units. The materials of examples 6, 7 and 8 do show pronounced shape memory properties. It should be noted in this connection that the elongation at break, for the materials exemplified here, increases with increasing PDL content of from 700 to 1200%. This clearly demonstrates the influence, concerning the mechanical properties, exerted by the type of composition. Generally speaking these illustrative examples show that the present invention provides a polymeric system enabling the controlled adjustment of desired properties.

| Example | PDL | PCL | Molecular weight of the polyester urethane | E-Module (70° C. / MPa) | Tensile strength (MPa) |
|---|---|---|---|---|---|
| 1 | 100 wt. %/ 10000 g/mol | | Mn = 192000 | 17 | 18 |
| 2 | 22 wt. %/ 10000 g/mol | 78 wt. %/ 10000 g/mol | Mn = 120000 | 1.4 | 5 |
| 3 | 41 wt. %/ 10000 g/mol | 59 wt. %/ 10000 g/mol | Mn = 196000 | 3 | 10 |
| 4 | 60 wt. %/ 10000 g/mol | 40 wt. %/ 10000 g/mol | Mn = 176000 | 7 | 8 |
| 5 | 80 wt. %/ 10000 g/mol | 20 wt. %/ 10000 g/mol | Mn = 185000 | 8.5 | 7 |
| 6 | 40 wt. %/ 2000 g/mol | 60 wt. %/ 4000 g/mol | Mn = 86000 | 3.5 35 (RT) | 4.5 23 (RT) |
| 7 | 50 wt. %/ 3000 g/mol | 50 wt. %/ 10000 g/mol | Mn = 75000 | 1.5 70 (RT) | 1.6 24 (RT) |
| 8 | 40 wt. %/ 3000 g/mol | 60 wt. %/ 10000 g/mol | Mn = 62000 | 3 45 (RT) | 9 30 (RT) |

In order to evaluate the temperature dependence of the mechanical properties experiments were conducted with the material of example 8. The results of these experiments are given in the following table and demonstrate that the tensile stretch remains almost without change even when heating the material to a temperature close to the melting temperature of the polypentadecalactone segments while E-modulus and tensile strength decrease. Comparable polyester urethanes comprising polyparadioxanone segments in place of th epolypentadecalactone segments do show a significantly lower tensile stretch.

| T (° C.) | Tensile stretch (%) | E-Modulus (MPa) | Tensile strength (MPa) |
|---|---|---|---|
| 22 | 900 | 45 | 30 |
| 37 | 1000 | 25 | 30 |
| 50 | 1000 | 12 | 20 |
| 55 | 1050 | 7 | 15 |
| 60 | 1050 | 3 | 10 |
| 65 | 1000 | 3 | 10 |
| 70 | 1000 | 3 | 9 |
| 75 | 1000 | 3 | 7 |
| 80 | 1000 | 1.5 | 3 |

Furthermore the material was subjected to experiments for the determination of the shape memory properties. Thermo-cyclic experiments were carried out (for an explanation of such experiments see for example the International Patent Applications described in the introductory part of the present application). Values for shape fixity (Rf) and shape recovery after the course of several cycles (Rr) were determined. The results are shown in the following table.

| Number of cycles | Rf (%) | Rr (%) |
|---|---|---|
| 1 | 98 | — |
| 2 | 98 | 85 |
| 3 | 98 | 98 |
| 4 | 98 | 99 |
| 5 | 98 | 99 |

The above shown experiments were conducted in such a manner that the shape memory effect was initiated at a temperature of 80° C. Similar results may be obtained if the shape memory effect is initiated at temperatures within the range of from 60 to 90° C.

In addition the following copolyester urethanes were produced and several mechanical properties were tested.

PDL-polyurethane Comprising Partially Crystalline Soft Segments

Composition of Polyester Urethane Comprising PDL
PDL=polypentadecadolactone, polyester
+PCL=polycaprolactone, polyester
+PCL-co-pTHF=polycaprolactone-co-polytetrahydrofuran, polyetherester
+pTHF=polytetrahydrofuran, polyether
+PPG=polypropyleneglycol, polyether
+PEG=polyethyleneglycol, polyether
(novel combination hydrophoblic (PPDL) hydrophilic (PEG)
Combination with PDL 3000 g/mol

| Material | % | | % | Mn |
|---|---|---|---|---|
| PDL 3000 g/mol | 100 | | | 69.000 |
| PDL 3000 g/mol | 50 | PCL 1000 g/mol | 50 | 72.000 |
| PDL 3000 g/mol | 50 | PCL 1250 g/mol | 50 | 105.000 |
| PDL 3000 g/mol | 50 | PCL 2000 g/mol | 50 | 83.000 |
| PDL 3000 g/mol | 40 | PCL 2000 g/mol | 60 | 76.000 |
| PDL 3000 g/mol | 50 | PCL 3000 g/mol | 50 | 75.000 |
| PDL 3000 g/mol | 40 | PCL 3000 g/mol | 60 | 89.000 |
| PDL 3000 g/mol | 50 | PCL 4000 g/mol | 50 | 85.000 |
| PDL 3000 g/mol | 40 | PCL 4000 g/mol | 60 | 95.000 |
| PDL 3000 g/mol | 50 | PCL 10000 g/mol | 50 | 87.000 |
| PDL 3000 g/mol | 40 | PCL 10000 g/mol | 60 | 103.000 |
| PDL 3000 g/mol | 30 | PCL 10000 g/mol | 70 | 89.000 |
| PDL 3000 g/mol | 60 | PCL 10000 g/mol | 40 | 73.000 |
| PDL 3000 g/mol | 40 | PCL-co-pTHF 2000 g/mol | 60 | 79.000 |
| PDL 3000 g/mol | 40 | PTHF 2500 g/mol | 60 | 45.000 |
| PDL 3000 g/mol | 40 | PPG 1200 g/mol | 60 | 65.000 |
| PDL 3000 g/mol | 40 | PPG 4000 g/mol | 60 | 53.000 |
| PDL 3000 g/mol | 40 | PEG 2000 g/mol | 60 | 28.000 |
| PDL 3000 g/mol | 40 | PEG 4000 g/mol | 60 | 32.000 |
| PDL 3000 g/mol | 40 | PEG 6000 g/mol | 60 | 40.000 |
| PDL 3000 g/mol | 40 | PEG 8000 g/mol | 60 | 42.000 |
| PDL 3000 g/mol | 40 | PEG 10000 g/mol | 60 | 43.000 |
| PDL 3000 g/mol | 40 | PEG 20000 g/mol | 60 | 50.000 |

Combination with PDL 2000 g/mol

| Material | % | | % | Mn |
|---|---|---|---|---|
| PDL 2000 g/mol | 30 | PCL 2000 g/mol | 70 | 75.000 |
| PDL 2000 g/mol | 40 | PCL 2000 g/mol | 60 | 95.000 |
| PDL 2000 g/mol | 50 | PCL 2000 g/mol | 50 | 65.000 |
| PDL 2000 g/mol | 60 | PCL 2000 g/mol | 40 | 73.000 |
| PDL 2000 g/mol | 70 | PCL 2000 g/mol | 30 | 46.000 |
| PDL 2000 g/mol | 30 | PCL 3000 g/mol | 70 | 99.000 |
| PDL 2000 g/mol | 40 | PCL 3000 g/mol | 60 | 72.000 |
| PDL 2000 g/mol | 50 | PCL 3000 g/mol | 50 | 78.000 |
| PDL 2000 g/mol | 60 | PCL 3000 g/mol | 40 | 73.000 |
| PDL 2000 g/mol | 70 | PCL 3000 g/mol | 30 | 65.000 |
| PDL 2000 g/mol | 30 | PCL 4000 g/mol | 70 | 49.000 |
| PDL 2000 g/mol | 40 | PCL 4000 g/mol | 60 | 62.000 |
| PDL 2000 g/mol | 50 | PCL 4000 g/mol | 50 | 85.000 |
| PDL 2000 g/mol | 60 | PCL 4000 g/mol | 40 | 83.000 |
| PDL 2000 g/mol | 70 | PCL 4000 g/mol | 30 | 56.000 |
| PDL 2000 g/mol | 30 | PCL 10000 g/mol | 70 | 85.000 |
| PDL 2000 g/mol | 40 | PCL 10000 g/mol | 60 | 109.000 |
| PDL 2000 g/mol | 50 | PCL 10000 g/mol | 50 | 130.000 |
| PDL 2000 g/mol | 60 | PCL 10000 g/mol | 40 | 121.000 |
| PDL 2000 g/mol | 70 | PCL 10000 g/mol | 30 | 91.000 |
| PDL 2000 g/mol | 30 | PCL-co-pTHF 2000 g/mol | 70 | 60.000 |
| PDL 2000 g/mol | 40 | PCL-co-pTHF 2000 g/mol | 60 | 78.000 |
| PDL 2000 g/mol | 50 | PCL-co-pTHF 2000 g/mol | 50 | 89.000 |
| PDL 2000 g/mol | 60 | PCL-co-pTHF 2000 g/mol | 40 | 59.000 |
| PDL 2000 g/mol | 70 | PCL-co-pTHF 2000 g/mol | 30 | 55.000 |
| PDL 2000 g/mol | 40 | PPG 1200 g/mol | 60 | 65.000 |
| PDL 2000 g/mol | 40 | PPG 4000 g/mol | 60 | 53.000 |
| PDL 2000 g/mol | 40 | PEG 2000 g/mol | 60 | 28.000 |
| PDL 2000 g/mol | 40 | PEG 4000 g/mol | 60 | 32.000 |
| PDL 2000 g/mol | 40 | PEG 6000 g/mol | 60 | 40.000 |
| PDL 3000 g/mol | 40 | PEG 8000 g/mol | 60 | 42.000 |
| PDL 3000 g/mol | 40 | PEG 10000 g/mol | 60 | 43.000 |
| PDL 3000 g/mol | 40 | PEG 20000 g/mol | 60 | 50.000 |

Mechanical Properties:

| Material | Temp. | E-Modulus | Tensile stretch |
|---|---|---|---|
| PDL-2k-co-PCL10k 40/60 | 20° C. | 35 | 1350% |
| PDL-2k-co-PCL10k 40/60 | 70° C. | 5 | 1000% |
| PDL-3k-co-PCL10k 40/60 | 20° C. | 145 | 1500% |

PDL-polyurethane Comprising Glassy Components

Composition of polyester urethanes with PDL

PDL=polypentadecadolacton, polyester
PLGA=poly-L-lactide-co-glycolide (ran), polyester
P-DL-LA=poly-DL-lactide, polyester

| Material | % | | % | Mn |
|---|---|---|---|---|
| PDL 3000 g/mol | 50 | PLGA 7000 g/mol | 50 | 65.000 |
| PDL 3000 g/mol | 40 | PLGA 7000 g/mol | 60 | 55.000 |
| PDL 2000 g/mol | 50 | P-DL-LA 6000 g/mol | 50 | 87.000 |
| PDL 2000 g/mol | 40 | P-DL-LA 6000 g/mol | 60 | 72.000 |
| PDL 2000 g/mol | 50 | P-DL-LA 10000 g/mol | 50 | 63.000 |

Mechanical Properties:

| Material | Temp. | E-Modulus MPa | Tensile stretch |
|---|---|---|---|
| PDL-3k-co-P-DL-LA6k 50/50 | 20° C. | 279 | 453% |
| PDL-3k-co-P-DL-LA6k 50/50 | 50° C. | 31 | 303% |
| PDL-3k-co-P-DL-LA6k 50/50 | 55° C. | 25 | 276% |

PDL-3k-co-P-DL-LA6k 50/50: copolyester urethane, comprising segments of PDL and P-DL-LA having an Mn of 3000 and 6000 g/mol, respectively, and comprising 50 et.-% of each of the segments PDL and P-DL-LA, respectively Shape Memory Properties:

| Material | Number of cycles | Recovery % | Fixity % |
|---|---|---|---|
| PDL-3k-co-P-DL-LA6k 50/50 | 1 | 46.5 | 98.4 |
| PDL-3k-co-P-DL-LA6k 50/50 | 2 | 87.3 | 98.8 |
| PDL-3k-co-P-DL-LA6k 50/50 | 3 | 96.8 | 99.1 |
| PDL-3k-co-P-DL-LA6k 50/50 | 4 | 97.9 | 98.5 |
| PDL-3k-co-P-DL-LA6k 50/50 | 5 | 98.2 | 98.5 |

Blends

The following blends were prepared and evaluated:

Blends Comprising PDL

Additives were mixed with a PDL polyester urethane having the composition PDL-3k-co-PCL-10k 40/60.

The following additive components were added in amounts of from 0.5 to 25 wt.-%:

Colorant (master batch comprising PDL-3k-co-PCL-10k 40/60 and about 5 to 10 wt.-% colorant)

nano-silver barium sulfate

For a blend comprising 10 wt.-% of the colored master batch the following shape memory properties were obtained.

Shape Memory Properties:

| Material | Number of cycles | Recovery % | Fixity % |
|---|---|---|---|
| 90% PDL-3k-co-PCL-10k 40/60 10% master batch blue | 1 | 30.5 | 98.3 |
| 90% PDL-3k-co-PCL-10k 40/60 10% master batch blue | 2 | 93.3 | 98.5 |
| 90% PDL-3k-co-PCL-10k 40/60 10% master batch blue | 3 | 96.5 | 99.5 |
| 90% PDL-3k-co-PCL-10k 40/60 10% master batch blue | 4 | 98.6 | 98.6 |
| 90% PDL-3k-co-PCL-10k 40/60 10% master batch blue | 5 | 99.2 | 98.9 |

Also blends with commercially available polymers, such as PE or PVC, when using of from 50% to 90% a PDL-polyurethane satisfactory shape memory properties, which correspond to those given above.

Shape Memory Blends

These blends are mixtures of pure PDL-polyurethanes with PCL and PCL-polyurethane, respectively. Only after a combination of the two materials yields a shape memory material. For preparing those blends both materials, the PDL-polyurethane and PCL or PCL-polyurethane are dissolved together and are subsequently precipitated (co-precipitation). In addition blends were prepared in the melt using a compounder (twin screw extruder).

Components Employed:

A: PDL-3k-polyurethane, Mn 95,000
B: PCL-10k-polyurethane, Mn 102,000
C: PCL; Mn 80,000

With a content of the PDL-component of from 20%–80% good shape memory properties were obtained. In particular using blend compositions with blend ratios of 40/60; 60/50; 60/40 correspond, as far as shape memory properties are concerned, to PDL-co-PCL-polyurethanes.

| Material | Number of cycles | Recovery % | Fixity % |
|---|---|---|---|
| 40% PDL-3k-polyurethane 60% PCL-10k-polyurethane | 1 | 55.5 | 98.2 |
| 40% PDL-3k-polyurethane 60% PCL-10k-polyurethane | 2 | 97.3 | 98.2 |
| 40% PDL-3k-polyurethane 60% PCL-10k-polyurethane | 3 | 98.5 | 99.1 |
| 40% PDL-3k-polyurethane 60% PCL-10k-polyurethane | 4 | 98.6 | 98.6 |
| 40% PDL-3k-polyurethane 60% PCL-10k-polyurethane | 5 | 99.1 | 98.9 |

PDL-Polyester Urethanes: Bio Compatability/degradation Behaviour

Experiments were carried out regarding the degradation behaviour of the resorbable materials. Degradation studies were conducted at body temperature (37° C.) in aqueous buffered solutions (phosphate buffer, pH 7, comprising $Na_2HPO_4$, $K_2HPO_4$ and $NaN_3$). In order to obtain estimates above long term behaviour so called accelerated degradation studies were carried out at 70° C. For the purpose of this evaluation samples are taken at defined times and molecular weight (Mn) as well as relative weight loss (%) are determined.

In the following table the results of evaluations for the material PDL-2k-co-PCL-10k are listed.

| Week | Mn [g/mol] | T = 70° C. Weight loss [%] | week | Mn [g/mol] | T = 37° C. Weight loss [%] |
|---|---|---|---|---|---|
| 0 |  | 185.000 | 0 | 185.000 | 0 |
| 1 | 0.08 | 175.000 | 2 | 184.000 | 0.06 |
| 2 | 0.11 | 152.000 | 6 | 183.000 | 0.12 |
| 3 | 0.16 | 134.000 | 10 | 184.000 | 0.15 |
| 4 | 0.19 | 76.314 | 18 | 182.000 | 0.17 |
| 6 | 0.24 | 27.054 | 29 | 180.000 | 0.20 |
| 8 | 0.29 | 8.769 |  |  |  |
| 12 | 5.90 | 2.178 |  |  |  |
| 16 | 22.65 | 2.469 |  |  |  |
| 21 | 41.61 | 2.123 |  |  |  |
| 25 | 49.36 | 3.061 |  |  |  |
| 29 | 53.06 | 2.976 |  |  |  |

In the following table the results of the degradation experiment using the material PDL-3k-co-PCL-10k are listed.

| week | Mn [g/mol] | T = 70° C. Weight loss [%] | week | Mn [g/mol] | T = 37° C. Weight loss [%] |
|---|---|---|---|---|---|
| 0 | 185.000 | 0 | 0 | 185.000 | 0 |
| 1 | 182.000 | 0.05 | 2 | 184.000 | 0.08 |
| 2 | 160.000 | 0.11 | 6 | 183.000 | 0.15 |
| 3 | 123.000 | 0.15 | 10 | 184.000 | 0.18 |
| 4 | 112.000 | 0.18 | 18 | 182.000 | 0.20 |
| 6 | 49.000 | 0.21 | 29 | 180.000 | 0.22 |
| 8 | 17.500 | 0.41 |  |  |  |
| 12 | 10.000 | 6.47 |  |  |  |
| 16 | 7.300 | 23.98 |  |  |  |
| 21 | 4.200 | 43.54 |  |  |  |
| 25 | 3.500 | 50.46 |  |  |  |
| 29 | 2.500 | 54.15 |  |  |  |

In addition the samples were evaluated under a microscope regarding possible surface modifications. A distinct change in the morphology of the surface could be detected.
Bio Compatability Studies:

For selected materials (PDL-3k-co-PCL-10k; PDL-2k-co-PCL-10k) experiments were carried out regarding the biological evaluation for medicinal products in accordance with ISO/EN/DIN 10993-5 (cytotoxicity). Samples were sterilised, prior to these experiments with ethylene oxide (EO).

Cytotoxicity evaluations were carried out using direct contact with the murine fibroblast cell line L929 (BioWithaker BE71-131F). Control of membrane integrity was carried out by PA 17 vital coloration (vital cells are colored green). Morphology of the cells after 24 h incubation was evaluated using Pa 13 hamalaun coloration.
Evaluation:

For bith samples membrane integrity was not affected by the materials of the present invention.

The morphology of the cells on the samples is, compared with the negative control, not changed. Cell apparence of the culture and the seeding efficiency on the material correspond to that of the negative control.

Processing of PDL-polyester Urethanes
Foam Extrusion:

After extruding and pelletizing the polymer, the polymer, in a second work up, is mixed with a master batch in a double srew extruder (chemical foaming agent Hydrocerol CT 572, product of Clariant), in order to obtain a foam (5% foaming agent, 95% PPDL-3k-co-PCL10k). The material, in the form of the rod in the temporary shape is comprssed to 25% of the initial diameter. Subsequently the rod is expanded again by heating the compressed rod. The initial (permanent) shape is recovered, during this recovery a force of 50N is exerted by the material.
Foams by TIPS A further method for producing porous structures is the "thermally indiced phase separation" (TIPS) eingesetz. A polymer solution (dioxan, 1 to 25 wt.-% polymer) is cooled at a defined gradient (from 60° C. to 3° C.). During cooling a liquid-liquid separation occurs first. Further cooling solidifies the formed phase structure. Using the material PDL-3k-co-PCL10k a foam could be produced. The solvent was removed using a high vacuum.

Preparation of Micro Carriers (d 100 nm–800 μm)

Preparation of microbeads from PDL-3k-co-PCL10k. Using an emulgator (PVA) an oil-in-water emulsion was prepared. By carfully removing the solvent spherical micro carriers were obtained. Using SEM a broad distribution of the particle size was found, as well as a non-uniformity regarding the particle shape. On average the particle size was in the range of from 100 to 200 μm, with the most part of the carriers showing a sperical shape. SEM evaluations furthermore showed that most of the carriers were hollow an collapsing under the electron beam. Evaluations of single carriers revealed that they showed a smooth surface having some sort of structure within the nanometer range.

The present invention provides novel polyester urethanes, which enable a controlled adjustment of desired profile of properties. The starting materials to be used are usual compounds, which are available without to much effort. The reactions to be used for preparing the prepolymers (macrodiols) are typical operations in the field of polymer chemistry, so that the polyester urethanes of the present invention may be obtained in a simple and efficient manner. The present invention enables to overcome the drawbacks of the known materials described above.

What is claimed is:

1. A polyester urethane comprising segments of polypentadecalactone units.
2. A polyester urethane according to claim 1 further comprising at least one further segment comprising ester units or ether units different from the polypentadecalactone units.
3. A polyester urethane according to claim 2, wherein the further segment is a partially crystalline segment comprising a polyester segment, a polyether ester segment, or polyether segments, or glassy segments comprising polyester or copolyester.
4. A polyester urethane according to claim 2, wherein the further segment comprises polycaprolactone segments (PCL), polycaprolactone-co-polytetrahydrofuran segments (PCL-co-pTHF), tetrahydrofliran segments (pTHF), polypropyleneglycol segments (PPG) or polyethyleneglycol segments (PEG).
5. A polyester urethane according to claim 2, wherein the further segment comprises poly-L-lactide-co-glycolide(ran) (PLGA) or poly-DL-lactide (P-DL-LA).
6. A polyester urethane according to claim 1, wherein the segments of the polypentadecalactone units have a number average molecular weight of from 1000 to 20000 g/mol.
7. A polyester urethane according to claim 1, wherein the further segment has a number average molecular weight of from 1000 to 20000 g/mol.
8. A polyester urethane according to claim 1, having a number average molecular weight in the range of from 50000 to 250000 g/mol.
9. A polyester urethane according to claim 1, obtained by reacting macrodiols with an aliphatic dilsocyanate.
10. A polyester urethane according to claim 1, comprising 10 to 80 wt.-% polypentadecalactone units.
11. A polyester urethane according to claim 1, having shape memory properties.
12. A polyester urethane according to claim 11, comprising 20 to 80 wt.-% caprolactone units and 80 to 20 wt.-% polypentadecalactone units, wherein the segments of caprolactone units have a number average molecular weight of from 3000 to 11000 g/mol and wherein the segments of polypentadecalactone units have a number average molecular weight of from 1000 to 10000 g/mol.
13. A blend comprising at least one polyester urethane according to claim 1 and at least one further component selected from the group consisting of polyethylene, polypropylene, polystyrene, PVC, fillers, colorants and medicaments.
14. A process for preparing a foam comprising at least one polyester urethane according to claim 1, the process comprising the step:
    compounding at least one polyester urethane according to claim 1 with a foaming agent and extruding the foam; or
    dissolving at least one polyester urethane according to claim 1 in a solvent and subjecting the solution to a thermally induced phase separation in order to prepare porous structures.

* * * * *